(12) United States Patent
Tonn et al.

(10) Patent No.: US 8,967,519 B2
(45) Date of Patent: Mar. 3, 2015

(54) SAFETY BELT RETRACTOR WITH VARIABLE LOAD TRANSFER IN DIFFERENT FUNCTION SETTINGS

(75) Inventors: Michael Tonn, Leezen (DE); Volker Carstens, Westermoor (DE); Doris Kröger, Tornesch (DE); Klaus-Werner Butenop, Herzhorn (DE)

(73) Assignee: Autoliv Development AB, Vårgårda (SE)

( * ) Notice: Subject to any disclaimer, the term of this patent is extended or adjusted under 35 U.S.C. 154(b) by 582 days.

(21) Appl. No.: 12/445,502

(22) PCT Filed: Sep. 29, 2007

(86) PCT No.: PCT/EP2007/008517
§ 371 (c)(1),
(2), (4) Date: Dec. 17, 2009

(87) PCT Pub. No.: WO2008/043447
PCT Pub. Date: Apr. 17, 2008

(65) Prior Publication Data
US 2010/0108796 A1  May 6, 2010

(30) Foreign Application Priority Data
Oct. 14, 2006  (DE) .......................... 10 2006 048 673

(51) Int. Cl.
*B60R 22/38* (2006.01)
*B60R 22/36* (2006.01)
*B60R 22/40* (2006.01)

(52) U.S. Cl.
CPC ................. *B60R 22/36* (2013.01); *B60R 22/38* (2013.01); *B60R 22/40* (2013.01)
USPC ...................... 242/383; 242/383.5; 242/396.4

(58) Field of Classification Search
USPC ........ 242/382, 383, 383.2, 383.5, 384, 396.4; 280/806, 807; 297/476–478
See application file for complete search history.

(56) References Cited

U.S. PATENT DOCUMENTS

| 3,632,059 | A | * | 1/1972 | Loose ......................... 242/382.1 |
| 4,170,329 | A | * | 10/1979 | Takada ........................ 242/383.3 |
| 4,177,962 | A | * | 12/1979 | Hildebrandt ............... 242/383.5 |
| 4,244,600 | A | * | 1/1981 | Takada ........................... 280/803 |
| 4,619,418 | A | | 10/1986 | Butenop |
| 6,106,013 | A | * | 8/2000 | Doty et al. .................... 280/806 |
| 6,158,685 | A | * | 12/2000 | Kielwein et al. ........... 242/383.2 |
| 2004/0149852 | A1 | * | 8/2004 | Blum et al. ................. 242/383.2 |

FOREIGN PATENT DOCUMENTS

| DE | 297 19 143 U1 | 2/1998 |
| DE | 103 57 812 A1 | 8/2004 |
| EP | 0 156 337 A2 | 10/1985 |

* cited by examiner

*Primary Examiner* — Sang Kim
*Assistant Examiner* — Angela Caligiuri
(74) *Attorney, Agent, or Firm* — Brinks Gilson & Lione

(57) ABSTRACT

A self-locking safety belt retractor has a blocking apparatus for a belt shaft mounted rotatably in a housing. The blocking apparatus includes a pawl inserted into a recess of the shaft front of the belt shaft which can be pivoted radially outward into engagement with the blocking apparatus. A blocking gearing (12) is oriented with respect to stop surfaces of the pawl (16) and to force transmission surfaces (25, 32) of the recess (15) such that, when the gear teeth of the pawl (16) are engaged in the blocking gearing (12) under normal load, a force acts between the blocking gearing (12) and the belt shaft (13) in a radial direction. If the load increases in a crash case, a force is transmitted in the circumferential direction due to plastic deformation of at least one housing gear tooth (28, 26) of the blocking gearing (12).

11 Claims, 2 Drawing Sheets

SAFETY BELT RETRACTOR WITH VARIABLE LOAD TRANSFER IN DIFFERENT FUNCTION SETTINGS

CROSS REFERENCE TO RELATED APPLICATION

This application claims priority to PCT/EP2007/008517, filed Sep. 29, 2007, and German Patent Application No. 10 2006 048 673.0, filed Oct. 14, 2006.

FIELD OF THE INVENTION

This invention relates to a self-locking safety belt retractor with a belt band sensitive and/or motor vehicle sensitive controllable blocking apparatus for a belt shaft pivoted in the housing segments of a U-shaped housing, whereby the blocking apparatus includes a pawl inserted into a recess of a shaft front end of the belt shaft and can radially pivot to engage into a blocking tooth system constructed on the allocated housing segment, whereby the pawl is braced in its pivot-out position with two stop surfaces on allocated force transmission surfaces of the recesses in the shaft front end, and under various loads, a stepped gear engagement between the teeth of the pawl and the blocking tooth system is formed, brought about by material deformation.

BACKGROUND AND SUMMARY OF THE INVENTION

One known self-locking safety belt retractor is described in European Patent EP 0 156 337 A2 ("the '337 patent"). The '337 patent discloses a U-shaped housing having two housing sides. The housing sides each include a circular opening for a belt shaft mounted therein. One of the two openings has an internal gearing running all around as a toothed blocking. One end of the belt shaft allocated to this opening is constructed for receiving a pawl in a countersunk or imbedded manner, as well as for pivotable mounting of the pawl. For this purpose, the pawl is constructed like a pendulum in the shape of an inverted "T" with a widened portion formed on the free end of the upright T beam, which rests in a reduced shank diameter portion formed in the depression of the shaft end so that the rotational axis for the pawl is formed in this way. The pawl is further carried through in a long hole from journal pins supported on each end of the belt shaft in resilient bearing cups so that under certain conditions, the belt shaft moves radially in the housing.

Due to the T shape of the pawl, several force transmission surfaces arise on the walls of a recess portion in the shaft end enclosing the T-shaped pawl at which the pawl, in various functional positions, comes to rest against allocated stop surfaces. Due to the construction of the gear teeth of the toothed blocking and the pawl, as well as the allocation of the gear teeth engagement surfaces in relation to the mounting of the pawl and the force transmission surfaces, a transmission of force in the circumferential direction exists in the event of a load (e.g., due to breaking, a car crash, etc.). It is moreover provided that the force transmission surface of the shaft end against which the allocated stop surface of the pawl lies in the event of geared tooth engagement, is constructed such that it acts as a resilient zone where material spikes can be crushed under a high load. In this way, it is assured that the blocking apparatus is not impaired in normal daily operation with gearings of the belt retractor housing and the pawl respectively coming into engagement under normal load. In the event of a crash, the resilient bearing cups are deformed with correspondingly higher load and thus the pawl comes into even deeper engagement with the toothed blocking due to a further radial swiveling with its gearing. One disadvantage is that there must exist a high gear tooth root strength due to the introduction of force taking place in the respective peripheral direction, especially on the toothed blocking fixed on the housing, to avoid shearing off the engaged gear teeth of the pawl that is associated with the belt retractor. From this there necessarily follows a relatively rough tooth distribution which has undesirably long latching or unlatching paths for the pawl. Likewise, a high material quality is necessary for constructing the toothed blocking.

One object of the present invention is to design an improved self-locking safety belt retractor so that the manufacturing expense is reduced in connection with short latching and unlatching paths, especially for the blocking apparatus.

The present invention provides a self-locking safety belt retractor with a blocking unit for a belt shaft which is rotatably mounted in housing segments of a U-shaped housing. The blocking unit includes a pawl pivotably mounted in a recess of a shaft front end of the belt shaft, wherein the pawl is configured to radially engage into a blocking tooth system constructed on a corresponding housing segment. The blocking tooth system and stop surfaces of the pawl, as well as force transmission surfaces of the recess of the shaft, are aligned in relation to one another such that when gear teeth of the pawl engage into the blocking tooth system under a normal load, a transmission of force takes place between the blocking tooth system and the belt shaft in a generally radial load direction. In the event of a rising load (e.g., a crash), the additional rising load is transmitted as a force acting in a generally peripheral direction due to the material (e.g., plastic) deformation of at least one engaged housing gear tooth. In this connection, the division of force transmission may be designed such that the load arising in normal operation of the belt retractor of ca. up to 5 kN is transmitted exclusively in a generally radial load direction, whereas in the event of a high load such as a crash, the maximal torque arising on the basis of the belt load acting on the belt shaft and the load resulting therefrom is transmitted or split up such that about ⅔ is transmitted through radial force absorption and about ⅓ is transmitted through the additional peripheral force absorption coming into action.

One advantage of the present invention is that despite the high belt load arising in the event of a crash, the use of a relatively fine gearing with a lower tooth gear depth makes it possible for short latching and unlatching paths to exist in connection with the modulation or remodulation of the latch. Moreover, the constructional cross section between the outer edge of the belt retractor housing and the gearing diameter can be kept smaller. Furthermore, a less high-grade, and thus more economical, material quality can be used for the design of the blocking tooth system.

According to one embodiment of the present invention, gear tooth flanks of the blocking tooth system running perpendicular to the generally peripheral direction are configured to deform in the event that a predetermined load acting upon them is exceeded.

The blocking tooth system of the present invention can be configured such that the tooth flanks forming a housing gear tooth of the blocking tooth system enclose an angle of greater than 90° with each other.

According to another embodiment of the present invention, the recess in the shaft front end accommodating the pawl has a first force transmission surface for the transmission of force in a generally radial direction and a second force transmission surface for the transmission of force in a generally peripheral direction, whereby the second force transmission surface does not lie on the allocated stop surface of the pawl during radial force transmission taking place under a normal load.

In addition, the first force transmission surface may be arranged as a surface enclosing a bearing opening constructed in the pawl for accommodating a journal arranged on the belt shaft. When the pawl is in blocking engagement with the blocking tooth system, the first force transmission surface lies radially with respect to the rotational axis of the pawl and opposite the front gear tooth of the pawl in a generally radial direction. Correspondingly, the second force transmission surface runs radially up to the outer circumference of the shaft front end and faces the load-introducing gear tooth flank of the front housing gear tooth in a generally circumferential direction when the pawl is engaged with the blocking tooth system in the generally circumferential direction. In this manner, the region of the pawl bearing the gear teeth is situated between the tooth flank and the second force transmission surface, whereby the second force transmission surface may be constructed on a nose projecting in the generally peripheral direction into a correspondingly shaped notch of the pawl.

According to yet another embodiment of the invention, the journal is deformed on its outer end projecting through the bearing opening of the pawl when the pawl is inserted such that the pawl is secured rotatably on the journal and is simultaneously secured against axial displacement. Thus, after setting the pawl upon the journal of the belt shaft and its end side deformation, a captive subassembly is created. Consequently, it is possible to manufacture and preassemble this subassembly consisting of the shaft body, the belt shaft and the pawl independent of further subassemblies of the belt retractor. The axial securing of the pawl on the journal moreover securely prevents the pawl from breaking away under a load and represents a form-locking cover between the shaft body of the belt shaft, the pawl and the housing side blocking tooth system in all operating states of the safety belt retractor.

Furthermore, the end of the journal may be deformed into a rivet head in a wobbling rivet process.

According to yet another embodiment of the present invention, the belt shaft has a depression on its front face for a snug installation of the pawl on the shaft front end, whereby the deformed end of the journal is also accommodated by the depression so that a snug closure of the pawl including the deformed end of the journal results in relation to the shaft front end.

According to yet another embodiment of the present invention, the shaft body of the belt shaft including the journal is constructed as a casting. In this way, a secure force transmission of the blocking forces arising under load is guaranteed.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

An embodiment of the invention is reproduced in the drawings which are described below, wherein.

DETAILED DESCRIPTION OF THE INVENTION

Figure 1:
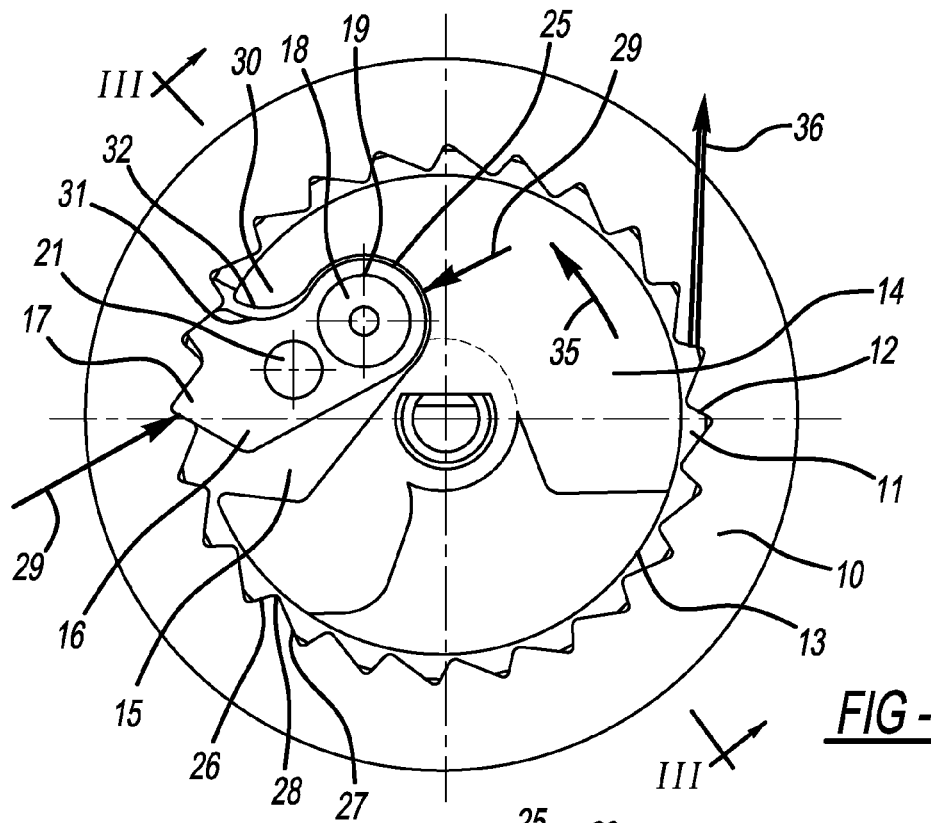
FIG. 1 illustrates a top view of the blocking side of a self-locking safety belt retractor with a housing segment, a shaft front end and a pawl when the pawl is pivoted out into a blocking tooth system under normal load with radial force absorption.

As shown in FIG. 1, a housing segment 10 associated with a blocking apparatus of a self-locking safety belt retractor is provided with a perforation 11 on which a blocking tooth system 12 running all around is constructed in the form of an internal gearing. A shaft body of a belt shaft 13 lies front face in the perforation 11, whereby the body of the shaft 13 has a recess 15 on its shaft front end 14 in which a blocking element such as a pawl 16 is rotatably mounted. The pawl 16 has two individual gear teeth 17 on its end which can be swiveled out of the contour of the shaft front end 14 and brought into blocking engagement with the blocking tooth system 12 of the housing segment 10 when the pawl 16 is in its blocking position, as represented in FIG. 1.

The pawl 16 is mounted with a recess defining a bearing opening 19 on its shaft side journal 18. In addition, the pawl 16 has a borehole 21 by means of which the pawl 16 can be controlled in relation to its swiveling in the various operating states of the safety belt retractor through engagement of a bearing pin or journal (not shown).

The blocking tooth system 12 consists of a sequence of gear teeth 28 which are formed by gear teeth flanks 26 as well as gear teeth flanks 27. As shown, the gear teeth flanks 26, 27 enclose an angle 37 of greater than 90 degrees with each other so that a relatively flat or relatively blunt gearing results. Gear teeth flanks 26 enclose an angle 38 with radial line 40, and gear teeth flanks 27 enclose and angle 39 with radial line 40. Angle 38 is smaller than angle 39.

A first force transmission surface 25 is formed on the boundary walls enclosing the recess 15 in the shaft front end 14 which encloses the bearing opening 19 formed in the pawl 16 for accommodating the journal 18 arranged on the belt shaft 13, and which radially faces the front gear tooth 17 of the pawl 16 in the generally circumferential direction in relation to the rotational axis of the pawl 16 defined by the journal 18 when the pawl 16 stands in engagement with the blocking gearing 12. In addition, a second force transmission surface 32 is provided, which is constructed in a region of the shaft front end 14 enclosing the recess 15 on a nose 30 projecting into a notch 31 constructed on the pawl 16. Moreover the nose 30 and the notch 31 are oriented such that the second force transmission surface 32 extending radially up to the outer circumference of the shaft front end 14 extends perpendicular or transverse to the generally circumferential direction and faces the load-introducing gear tooth flank 26 of the circumferentially front gear tooth 28 engaged by the pawl 16 when the pawl 16 is in blocking engagement with the blocking tooth system 12. Thus, the region of the pawl 16 bearing the gear teeth 17 is placed between the gear tooth flank 26 of the blocking tooth system 12 and the second force transmission surface 32.

As apparent from FIG. 1, a belt (not shown) being pulled in the direction depicted by arrow 36 induces rotation of the belt shaft 13 in the direction of arrow 35, and a radial displacement of the pawl 16 takes place under corresponding control conditions such that the two gear teeth 17 of the pawl 16 engage in the blocking tooth system 12 of the housing segment 10. If this gear engagement takes place under normal load, e.g., approximately up to a load of 5 kN, then the second force transmission surface 32 on the nose 30 does not reach into engagement on a stop surface of the pawl 16 constructed on the notch 31. As a result, due to the support of the gear teeth 17 of the pawl 16 on gear teeth flanks 26 and 27 of the blocking gearing 12, a transmission of force occurs exclusively in the direction corresponding to arrows 29.

Figure 2:
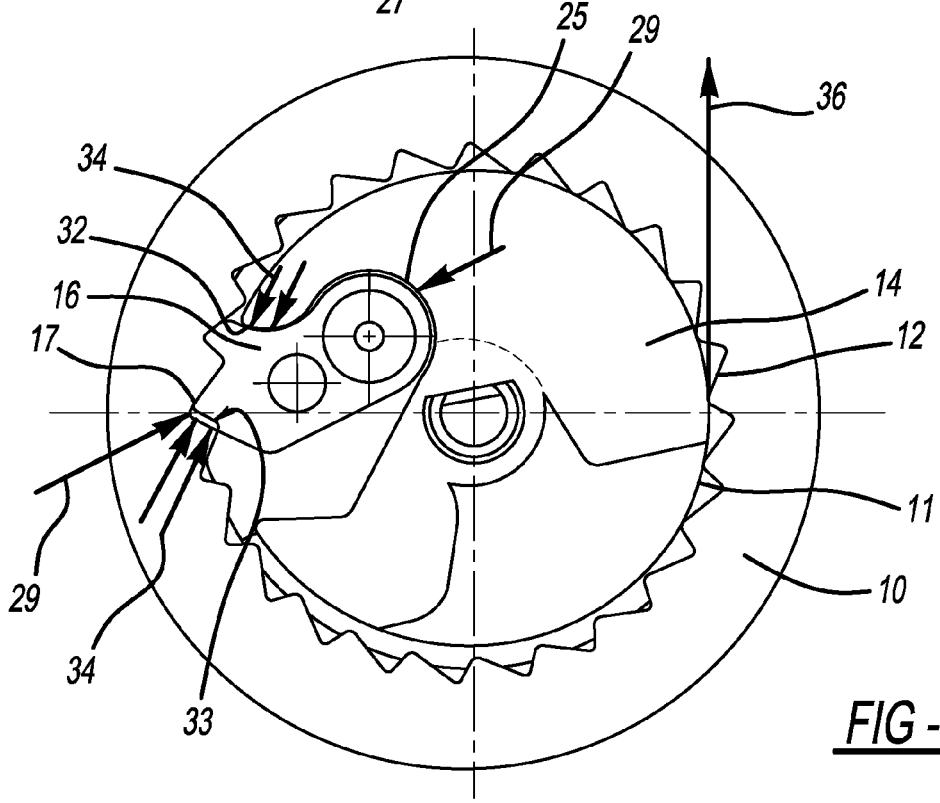
FIG. 2 illustrates the object of FIG. 1 in the event of a full load arising in a crash and additional circumferential force absorption.

Referring now to FIG. 2, if the belt shaft 13 experiences a greater load in the direction of arrow 36, such as in the event of a crash, then the gear tooth 17 of the pawl 16 situated in front in the generally peripheral direction buries itself into the engaged gear tooth flank 26 of the blocking tooth system 12 which yields in a deformation region indicated by 33. Due to this deeper gear tooth engagement, the nose 30 now comes to rest against the second force transmission surface 32 on the notch 31, so that a force transmission also takes place in the generally circumferential direction in accordance with arrows 34. Consequently, under full load, the force to be absorbed is drawn off in a generally radial loading direction as well as in a generally circumferential direction from the pawl 16 into the blocking tooth system 12 of the housing segment 10.

Figure 3:
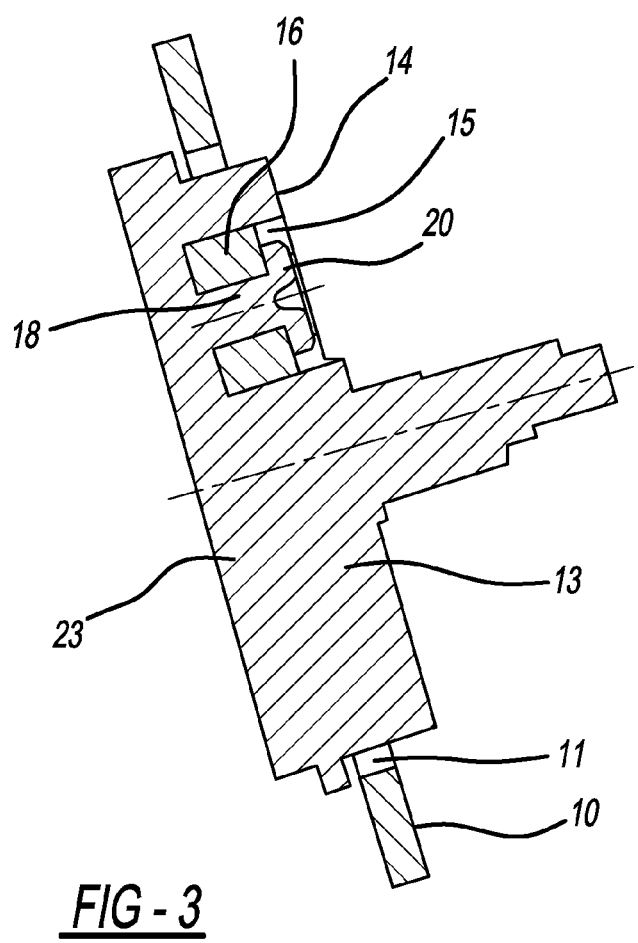
FIG. 3 illustrates a cross-sectional view of the self-locking safety belt retractor taken along the lines III-III in FIG. 1.

Referring now to FIG. 3, the free end of the journal 18 is deformed into a rivet head 20 through a wobbling rivet process, for example, which overlaps the pawl 16 externally and hence ensures an axial fixing in position and securing of the pawl 16 on the journal 18. Moreover, the material thickness of the pawl 16 is dimensioned smaller that the depth of the depression 15 accommodating the pawl 16, such that the rivet head 20 of the journal 18 is likewise accommodated snugly by the depression 15 of the shaft body 23.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. A self-locking seat belt retractor including a blocking device responsive to one of seat-belt or vehicle motion, the blocking device comprising:
    a belt shaft rotatably mounted in housing segments of a housing, the belt shaft having a shaft front end;
    a locking pawl pivotably mounted and operable to extend radially outward to engage with a blocking tooth system formed on a housing segment of the housing segments, the locking pawl being supported in the shaft front end by a first and a second stop surface when the locking pawl is in a pivoted-out position, the first and second stop surfaces being disposed on corresponding first and second force transmission surfaces of the shaft front end;
    wherein in loading situations of differing magnitude, a stepped toothed engagement, brought about by means of deformation, is formed between pawl teeth of the locking pawl and blocking teeth of the blocking tooth system,
    wherein the blocking tooth system is oriented with respect to the stop surfaces of the locking pawl and the first and second force transmission surfaces of the shaft front end such that, when the locking pawl is in a toothed blocking engagement with the blocking tooth system under a load, the locking pawl transmits a first force between at least one blocking tooth of the blocking tooth system and the first transmission surface in a generally radial loading direction with respect to an axis of rotation of the locking pawl as long as the load remains below a predetermined value representative of a crash, and that the locking pawl causes a deformation of the at least one blocking tooth when the load exceeds the predetermined value, only the deformation of the blocking tooth allowing the locking pawl to come into contact with the second transmission surface of the blocking tooth system and to transmit a second force onto the blocking tooth in a generally circumferential direction with respect to the axis of rotation of the locking pawl, the second force in the generally circumferential direction being effective only after the deformation of the blocking tooth.

2. The self-locking seat belt retractor according to claim 1, wherein the blocking teeth are formed by teeth flanks, the teeth flanks being deformable when the load acting upon the teeth flanks exceeds the predetermined value.

3. The self-locking seat belt retractor according to claim 2, wherein each of the blocking teeth is formed by a pair of teeth flanks of the teeth flanks, the pair of teeth flanks enclosing an angle greater than 90 degrees with respect to each other.

4. The self-locking seat belt retractor according to claim 1, wherein the second force transmission surface is formed on a lug projecting in the generally circumferential direction with respect to the axis of rotation of the locking pawl into a correspondingly shaped indentation in the locking pawl.

5. A self-locking seat belt retractor including a blocking device responsive to one of seat-belt or vehicle motion, the blocking device comprising:
    a belt shaft rotatably mounted in housing segments of a housing, the belt shaft having a shaft front end;
    a locking pawl pivotably mounted and operable to extend radially outward to engage with a blocking tooth system formed on a housing segment of the housing segments, the locking pawl being supported in the shaft front end by a first and a second stop surface when the locking pawl is in a pivoted-out position, the first and second stop surfaces being disposed on corresponding first and second force transmission surfaces of the shaft front end;
    wherein in loading situations of differing magnitude, a stepped toothed engagement, brought about by means of deformation, is formed between pawl teeth of the locking pawl and blocking teeth of the blocking tooth system;
    wherein the blocking tooth system is oriented with respect to the stop surfaces of the locking pawl and the first and second force transmission surfaces of the shaft front end such that, when the locking pawl is in a toothed blocking engagement with the blocking tooth system under a load, the locking pawl transmits a first force between at least one blocking tooth of the blocking tooth system and the first transmission surface in a generally radial loading direction with respect to an axis of rotation of the locking pawl as long as the load remains below a predetermined value representative of a crash, and that the locking pawl causes a deformation of the at least one blocking tooth when the load exceeds the predetermined value, only the deformation of the blocking tooth allowing the locking pawl to come into contact with the second transmission surface of the blocking tooth system and to transmit a second force onto the blocking tooth in a generally circumferential direction with respect to the axis of rotation of the locking pawl, the second force in the generally circumferential direction being effective only after the deformation of the blocking tooth;
    wherein the first force transmission surface of the shaft front end is configured to transmit the first force in the generally radial direction with respect to the axis of rotation of the locking pawl;
    wherein the second force transmission surface of the shaft front end is configured to transmit the second force in the generally circumferential direction with respect to the axis of rotation of the locking pawl; and wherein the second force transmission surface does not bear against the second stop surface of the locking pawl during a radial transmission of force occurring during the load that remains below the predetermined value.

6. The self-locking seat belt retractor according to claim 5, wherein the first force transmission surface is arranged as a surface surrounding a bearing opening in the locking pawl to receive a bearing journal arranged on the belt shaft, and wherein the first force transmission surface is radially oriented with respect to the axis of rotation of the locking pawl and oppositely disposed with respect to a pawl tooth of the pawl teeth when the locking pawl is in blocking engagement with the blocking tooth system, the pawl tooth being frontally disposed in the generally circumferential direction with respect to the axis of rotation of the locking pawl.

7. The self-locking seat belt retractor according to claim 6, wherein the bearing journal is deformed at an outer end thereof when the locking pawl is placed onto the bearing journal, the outer end protruding through the bearing opening of the locking pawl such that the locking pawl is rotatably disposed on the bearing journal and secured against axial displacement.

8. The self-locking seat belt retractor according to claim 7, wherein the outer end of the bearing journal is deformed by way of a wobbling riveting process to form a rivet head.

9. The self-locking seat belt retractor according to claim 8, wherein the shaft front end includes a depression for mounting the locking pawl and the rivet head in the shaft front end in a flush manner.

10. The self-locking seat belt retractor according to claim 9, wherein the depression of the shaft front end snugly accommodates the rivet head.

11. The self-locking seat belt retractor according to claim 6, wherein the second force transmission surface runs radially to an outer circumference of the shaft front end, and wherein the second force transmission surface is oriented in the generally circumferential direction with respect to the axis of rotation of the locking pawl opposite to a load-introducing tooth flank of the pair of teeth flanks forming one blocking tooth of the blocking teeth when the locking pawl is in blocking engagement with the blocking tooth system, such that a locking pawl region bearing the pawl teeth is placed between the load-introducing tooth flank and the second force transmission surface, the load-introducing tooth flank being frontally disposed in the generally circumferential direction with respect to the axis of rotation of the locking pawl.

* * * * *